Patented Jan. 7, 1936

2,027,167

UNITED STATES PATENT OFFICE 2,027,167

CONFECTION

Benjamin R. Harris, Chicago, Ill.

No Drawing. Application June 4, 1934,
Serial No. 728,958

22 Claims. (Cl. 99—16)

My invention relates to compositions of matter such as candy confections. It relates more in particular to the improvement of candy confections of a type wherein a comminuted material, including sugar, is combined with a fat, as, for example, in chocolate, chocolate-like coatings for candy, ice cream, cookies, and other confections, toffees, caramels, icings, filling, fudges, butter creams, and other compositions of this class, the determinants of which will be more fully identified throughout the specification.

For an understanding of the problems and advantages of the present invention, reference may be had to so-called chocolate enrobing compositions. Here there is a specific problem in producing a chocolate enrobing composition having a suitable viscosity at a temperature at which the material can be conveniently worked. Attention must also be given to retaining a suitable viscosity for a sufficient period to facilitate commercial manipulations. It is known that viscosities can often be reduced by increasing the fat content, but in general this particular approach of the problem is not satisfactory, as those skilled in the art understand. Similar problems exist in the manufacture and use of icings wherein powdered sugar and fat usually are employed.

In the manufacture of certain other confections, such as toffees, caramels, fudges, and the like, fatty ingredients are heated at a high temperature with comminuted solids, such as sugar, in the presence of relatively small amounts of moisture, and it is necessary to have an emulsifying agent in order to maintain a stable emulsion at the high temperature. In the preparation of cooked toffee, for example, a temperature of about 285° F. is employed to reduce the moisture content of the syrup.

The principal object of the invention is to improve confections of the general character described.

Another object is the provision of a new ingredient for use in compositions of the character outlined.

Another object is the provision of an improved composition of matter of the type wherein comminuted material is dispersed in a fatty material wherein the composition is substantially moisture free.

Another object is to reduce the viscosity of confections of the general character indicated by the incorporation therewith of relatively small amounts of an improved addition substance.

A further object is the utilization of an improved emulsifying agent in toffees and the like which are heated to a relatively high temperature.

Other objects and features of the invention will be apparent as the detailed description thereof progresses.

A common characteristic of confections of the character referred to hereinabove is the dispersion of relatively large amounts of comminuted material such as powdered sugar, powdered cocoa, dried milk powder and the like, in a fatty material, with substantially no moisture present or in the presence of only relatively small amounts of moisture, as will be shown somewhat more in detail as this description progresses. The invention is best described in its relation to confections, in the treatment of which it offers very marked advantages; but the invention may be applied as well to the treatment of compositions in analogous arts.

I have discovered that I can produce significant improvements in confections of the character referred to by the incorporation in such confection compositions of relatively small amounts of a class of sulfate substances which I shall refer to more in detail in a later part of this specification. The sulfate substances all possess a lipophile group, in the molecule, having a definite affinity for oils and fats, and a hydrophile group having an affinity for aqueous or non-oleaginous media, the hydrophillic function in the molecule being imparted thereto primarily by a sulphate group. These improvers operate as interface modifiers to reduce the viscosity of the confection composition in which they are employed; they appear to function in other ways, however, and the advantages flowing from their use are greater than a mere reduction in viscosity. The amount of these materials which may be employed is of the order of ¼% to 5% on the basis of the fat used, although greater or lesser amounts may be employed, if desired. The amount used is determined in part by the potency of the particular improver in question, and the amount of effect desired in the confection composition.

The character of improvement effected by the introduction of my interface modifiers naturally varies with the composition of matter at hand. For example, in a conventional chocolate mix, such as 148 parts of powdered sugar (6X cane sugar), 52 parts of cocoa powder (12% fat content), 100 parts of cocoa butter, and flavoring, the principal improvement is a substantial reduction in viscosity. In a conventional toffee mix, for example, consisting of 60 parts of coconut stearine, 140 parts of 4X sugar, 20 parts of invert sugar, and 20 parts of water, wherein the mix is boiled at about 285° F., and the fat must emulsify and remain emulsified at this relatively high temperature, the improvement is largely one in the ease of emulsification and the stability of the emulsion obtained. In still other preparations, additional improvements are found such as in the character of texture, appearance, and/or flavor, but it is to be noted that in every instance, whatever the character of the improvement at hand, the physical chemical mechanism is, in great part, one of interface modification effected by the introduction of the class of interface modifiers which I employ herein.

The interface modifiers of my invention are conveniently described by the methods employed in the manufacture thereof. It may be stated, however, that in accordance with a general method, a material having at least one lipophile group and an esterifiable hydroxy group may be treated with a suitable sulfating agent such as sulfuric acid to form an ester at the hydroxy group, the result being the formation of a substance wherein a hydrophillic sulfate group replaces the hydroxy group. Representative methods capable of application to produce several improving agents according to the same general class are given below. The substance produced in each case is an ester of sulphuric acid.

*Example A*

A suitable product for modifying the viscosity of confections in accordance with my invention may be produced from commercial cocoa butter. In carrying out the method, 15 parts of sulphuric acid (specific gravity 1.84) and 15 parts of cocoa butter are used. The acid is ground into the cocoa butter or thoroughly dispersed therein at room temperature. After standing about one hour the mass is washed several times with hot brine above the melting point of the product. The sulphuric acid ester is then extracted with ether, filtered, and the ether evaporated from clear solution. The product produced has the appearance of a soft grayish white fat, but has hydrophillic properties due to the incorporation of the sulphate group. From 2 to 3% of this material, based upon the fat in the composition, has a definite effect in reducing viscosity, employing a testing method of a character to be set out more fully hereinafter.

*Example B*

Substances like cetyl hydrogen sulphate may be used with my invention and a suitable method of preparation is as follows: 10 parts of cetyl alcohol are dissolved in 100 parts of ethylene dichloride. 2.7 parts of chlorsulphonic acid employed as the "sulphonating" agent are dissolved in 40 parts of ethylene dichloride. The chlorsulphonic acid solution is added slowly to the cetyl alcohol solution with constant stirring and maintaining the temperature between approximately minus 10° C. and minus 15° C. Solid carbon dioxide may be used as the cooling agent. When the reaction has gone to completion, the ethylene dichloride is evaporated, preferably at room temperature.

The product produced is a light colored solid of a fatty character but having marked hydrophillic properties. When employed in proportions of about 2 to 3%, it has a definite effect in reducing the viscosity of confection compositions of the character referred to. Greater or lesser amounts may be employed, depending upon the effect desired.

*Example C*

Substances comprising essentially di-fatty acid polyglycerol sulphate may be prepared in the following manner: The polyglycerol is produced by polymerizing substantially water free glycerine employing approximately .1% of an alkali such as caustic soda as a catalyst. Suitable polymerization occurs if the reaction is allowed to proceed for about four and one-half hours, while maintaining a temperature of between 250 and 275° C. The dioleic acid ester is produced by first forming the mono-oleic acid ester of polyglycerol. This is accomplished by mixing together one equivalent of oleic acid with an excess of the polyglycerol and heating the mixture at about 200° C. for one hour. The excess polyglycerol is drawn off and one equivalent of oleic acid added and heating continued again at about 200° C. for about one hour or until not more than about 1% of free oleic acid remains. The product is then washed and dried.

The sulphate is formed by dissolving 1.9 parts of chlorsulphonic acid in 40 parts of ethylene dichloride and adding this gradually to 20 parts of dioleyl polyglycerol dissolved in 100 parts of ethylene dichloride with constant stirring. During this time, the temperature is maintained at about minus 10° to about minus 15° C. The product is neutralized with anhydrous ammonia gas, filtered, and the ethylene dichloride evaporated from the clear solution at approximately room temperature.

The product produced is a dark brown viscous material with pronounced hydrophillic properties. Amounts as small as ½% based upon the fat have a very marked effect in reducing viscosity of confection compositions. Partially hydrogenated fatty acids or oils at melting points from 80 to 100° F. may be used to prepare the diglyceride sulphates and their innocuous salt.

*Example D*

Substances of a class of distearine sulphate may be made according to the following method: Stearic acid is heated with a large excess of glycerine with constant stirring in a non-oxidizing atmosphere at about 220° C. until the amount of free fatty acids present is less than 1%. The mixture is then allowed to stand until it is cool and the excess of glycerine which separates to the bottom is drawn off. One equivalent of stearic acid is now added, one equivalent being, of course, the same as the amount of stearic acid originally employed. This mixture is heated with constant stirring in a non-oxidizing atmosphere at about 240° C. until the amount of free fatty acid is less than 1%. The resulting product, which consists essentially of distearine, is purified and dried, after which it is treated by the following steps of the method to produce the sulphate:

1.4 parts of sulphur trioxide dissolved in 30 parts of chloroform are added slowly with constant stirring to 10 parts of distearine dissolved in 100 parts of chloroform. The chloroform used should be free of alcohol. During the treatment of the distearine with the sulphur trioxide, a temperature below minus 15°C. should be maintained. When all of the sulphur trioxide chloroform solution has been stirred in, the stirring is continued and the product allowed to come gradually to room temperature. It is then cooled in an ice bath and neutralized with dry ammonia gas. The chloroform solution is filtered and may be concentrated by evaporating the chloroform at room temperature, although temperatures somewhat above room temperature may be employed with safety.

The distearine sulphate produced by this method is a faint yellow waxy solid, freely dispersible in water. It has a pronounced effect in reducing the viscosity of confection compositions when used even in relatively small proportions.

Example E

Substances like fatty acid diethylene glycol ester sulphate may be produced according to the following methods: 10 parts of fatty acid diethylene glycol ester are dissolved in 20 parts of chloroform and cooled in ice water. 1½ parts of chlorsulphonic acid are now dissolved in 10 parts of chloroform and added slowly with vigorous stirring to the fatty acid diethylene glycol ester solution, care being taken that the rate of addition of the chlorsulphonic acid solution be sufficiently slow so as to avoid raising the temperature of the reaction mixture appreciably. After all of the chlorsulphonic acid solution has been introduced, the reaction mixture may be aspirated with a dry inert gas to carry out most of the hydrochloric acid formed during the reaction. Dry ammonia gas may be used to neutralize and the final product obtained by distilling off the chloroform.

The fatty acid esterified with diethylene glycol in this example may be a pure fatty acid or it may be a mixture thereof derived from a commercial oil or fat. In either case, the fatty acid diethylene glycol ester is prepared by employing a great excess of the diethylene glycol as compared to one equivalent of the fatty acid used. By employing this method, the product produced is essentially a mono-ester with a remaining hydroxy group for the attachment of the sulphate radical. Products produced in accordance with this method also have a marked effect in lowering the viscosity of confection compositions, although in some instances, somewhat greater amounts may be required.

Example F

Very satisfactory substances may be prepared by using the general procedure of Example C, except that instead of forming the di-fatty acid ester of polyglycerol, the mono-fatty acid thereof is treated directly with approximately the same proportion of chlorsulphonic acid as given in Example C. Ethylene dichloride is suitable for the solvent in this case as well. The mono-oleyl polyglycerol sulphate (neutralized with ammonia) prepared in accordance with this method has a marked effect in reducing the viscosity of confection compositions, particularly when used in proportions somewhat greater than 1%, although proportions of 1% and below compare very favorably in their action with that of any other substances capable of use for the purpose.

Example G

A very satisfactory type of product is formed by treating the mixed diglycerides of commercial oils to esterify the remaining hydroxy radical with a sulphate group according to the following illustrative example: Corn oil is mixed with a great excess of glycerine and heated with constant stirring for two hours at about 220° C. or slightly above, in a non-oxidizing atmosphere, employing a small amount of an alkali as a catalyst, if desired, until a re-esterification occurs and a product is produced comprising essentially the mixed mono-fatty acid esters of glycerine. The product is allowed to stand until the unreacted glycerine separates out. This glycerine is now drawn off and approximately one equivalent of mixed fatty acids is esterified with the mono-ester to produce the diglyceride. Oleic acid may be used suitably for the purpose. By another method, a product consisting essentially of mixed diglycerides may be prepared by employing 95 parts of glycerine to 1400 parts of corn oil or other vegetable oil such as cotton seed oil, partially hydrogenated cotton seed oil, oleo oil or lard, and heating the mixture with stirring in a non-oxidizing atmosphere or stirring by means of passing $CO_2$ or nitrogen therethrough with or without an alkaline catalyst such as soap, caustic alkali, metal alcoholates, or the like, for about two hours at about 240° C. until re-esterification is completed.

The mixed diglycerides are now dissolved in a suitable solvent such as ethylene dichloride in proportions of about 20 parts of mixed diglycerides to 100 parts of the solvent. 1.9 parts of chlorsulphonic acid are dissolved in 40 parts of ethylene dichloride and the chlorsulphonic acid solution added slowly with constant stirring to the diglyceride solution, the temperature being maintained at approximately minus 10° C. or below. The product is neutralized with anhydrous ammonia gas and the ethylene dichloride evaporated at room temperature. If a different solvent is used, it is removed by appropriate means. When a relatively soft or plastic material is used, the solvent may be eliminated and the chlorsulphonic acid is added gradually while working the substance in a kneading machine or the like at approximately the same low temperatures. This applies to this example and the other examples shown. The sodium or other innocuous salt of the diglyceride sulphate may also be prepared.

The product employing this method and comprising principally the sulphated mixed diglycerides of corn oil fatty acids or partially hydrogenated cotton seed oil fatty acids is lipophillic in character, although having hydrophillic properties as well. It is extremely potent as a viscosity modifier in about ¼ to ½% based on the fat, in a chocolate mix containing cocoa powder, powdered sugar, fat, or similar composition referred to herein, and favors markedly the formation of water in oil emulsions. Although many of the examples given above show the introduction of a sulphate group by means of chlorsulphonic acid, it is to be noted that other "sulphonating" agents may be used under appropriate conditions to introduce a sulphate group, such as sulphur trioxide, concentrated sulphuric acid and sulphuryl chloride.

Representative substances which may be used in practicing the present invention are listed below:

"Sulphonated" diglycerides of corn oil (ammonium salt).
"Sulphonated" diglycerides of cocoanut stearin (ammonium salt).
"Sulphonated" diglycerides of cocoanut oil (ammonium salt).
Di-olein-β sulphate (sodium salt)

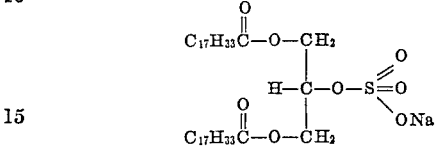

Diolein α sulphate (ammonium salt)
Di-laurin-β sulphate (sodium salt)

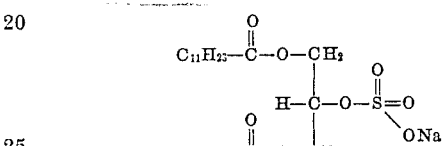

Di-laurin-α sulphate (sodium salt)

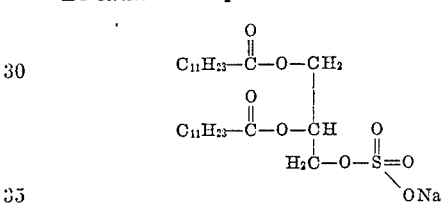

Di-laurin sulphate (ammonium salt)
Dicapryllin-β sulphate (ammonium salt)

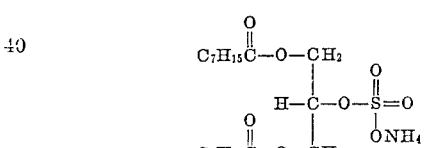

Dicapryllin-α sulphate (ammonium salt)
Distearine ammonium sulphate
Cetyl hydrogen sulphate
Dodecyl sodium sulphate

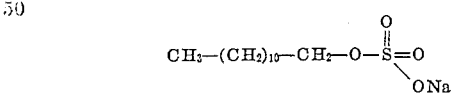

Octyl ammonium sulphate

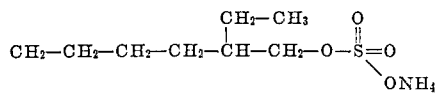

Monostearin sulphate (ammonium salt)

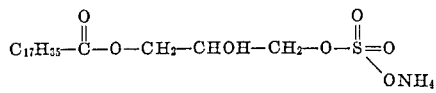

Monostearine di-ammonium disulphate
Monopalmityl diglycerol sulphate (ammonium salt)

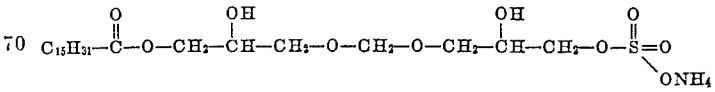

Dioleyl polyglycerol sulphate (ammonium salt)
Mono-oleyl polyglycerol sulphate (ammonium salt)

Lauroyl diethyleneglycol sulphate (ammonium sulphate)

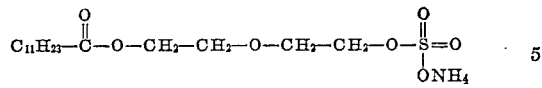

Dilauryl glyceryl ether β sulphate (ammonium salt)

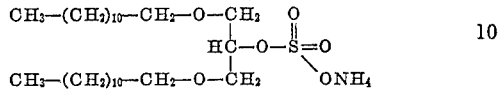

Hexadecyl diethyleneglycol ether sulphate (ammonium salt)

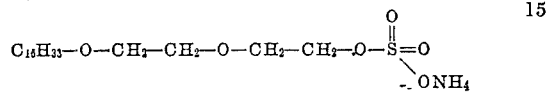

Sulphonated mixed fatty acid esters of diethylene glycol.
Sulphonated cocoa butter, and or their sodium and ammonium, and other innocuous salt.

While most of the examples given above represent single substances, it is sometimes advantageous to employ mixtures. Illustrative methods of producing suitable mixtures have been given, and some mixtures have been listed in the examples.

The products which I employ are all sulphuric acid esters having a relatively great lithophile mass, preferably eight carbons or more in the lipophile group proper. Although some of them are dispersible in water, they are not soluble therein. They are preferably soluble in oils and fats, at least to the extent in which their use is required in fatty compositions, namely up to say approximately 3%. In this connection, it is to be noted, however, that many of the substances are amply potent so that not more than ½% thereof are required to be used. In a substance of this kind obviously, the solubility in oils and fats, if of the order of ½%, is satisfactory.

The physical properties of the products depend a great deal upon the starting materials. The products from relatively high molecular weight alcohols in general will be found to produce rather dark, or at least solid, final products usually of a dark color. The consistency of the product is not of prime importance, insofar as its potency is concerned, providing a sufficient amount thereof may be incorporated with the fat of the composition. It may be stated, however, that in general a product having approximately a consistency of the fat used is rather more readily incorporated therewith and there is some evidence to the effect that practically, everything else being equal, a somewhat plastic consistency favors viscosity reduction. This may be due purely to the ease with which the material is incorporated in the fat.

It will be noted that the greater number of materials which I describe consist essentially of relatively high molecular weight fatty acid esters of polyhydroxy substances wherein the same molecule comprises also an ester of sulphuric acid. It is not essential to the invention, however, that the lipophile radical be in the form of an ester group in products of this kind. An ether linkage may be suitable in many cases, care being exercised, of course, that the product employed is non-toxic in character. In forming compounds for use in accordance with the present invention, any suitable polyhydroxy substance may be used such as polyhydric alcohols, such as glycol, glycerine and polymers thereof, sugars, sugar alcohols, hydroxy carboxylic acids, and the like. The products used with my invention, which I may term, for convenience, "interface modifiers", function in other ways that merely to reduce viscosity. Most of them have marked emulsifying properties, and some of them, particularly promote the formation of water in oil emulsions. To various degrees, most of them possess anti-spattering functions of the kind described in my prior United States Patent No. 1,917,256. Most of them disperse rather readily in oils, fats and waxes, particularly when the temperature is selected, with cognizance of the melting points of the interface modifiers as well as the melting points of the fatty materials in which they are to be distributed.

As an example of the advantages to be obtained from the use of my invention, the use thereof with a conventional chocolate coating composition may be considered. A definite amount of a given chocolate composition, consisting essentially of a fat in which powdered materials, including sugar and cocoa powder, were dispersed, was found to require a given time at a given temperature to flow through a given orifice. In making a test of this character, the composition is milled warm according to the usual custom for about fifteen minutes and then allowed to cool down to the temperature employed in the test. The materials of my invention were employed in the same composition in varying proportions based upon the fat from about ¼% up to as much as 3%, depending upon the character of the interface modifier used. In general, by the use of the present invention, a marked reduction in the time required for the composition to flow through the orifice at 43° C. resulted. In several cases, the use of proportions as low as ½% reduced the time of flow to less than half. In some cases, when employing somewhat more than ½%, the time of flow was still further decreased, even down to approximately one-third of the time required, without the use of the interface modifier. Those in the industry understand that this reduction in viscosity may be taken advantage of in many ways. For example, the proportion of fat may be decreased, thus effecting a saving, it being well known in the industry that, everything else being equal, the viscosity can be controlled in an appreciable extent by controlling the proportion of fat used.

Other advantages, some flowing from the reduction in viscosity, and others from the general interface modification resulting from the use of my substances, may be pointed out. For example, the improvements effected make possible lower enrobing temperatures; they make possible longer cooling periods, thereby permitting longer time in tunnels; greater range of working temperatures on the enrobing machine is possible; tempering is more uniform and gradual; in the cooking of toffees, by virtue of the fact that a far superior and a much more stable emulsion is obtained, the cooking is more flexible and tolerates considerably more abuse and variation than heretofore, without detrimental effects on the ultimate product; the tendency to "blooming" is considerably diminished and delayed. In many instances, additional desired characteristics inure to the products concerned, by virtue of the diminished fat content.

This reduction of viscosity, of course, may be taken advantage of in various ways and may also be employed for the purpose of economizing in the proportion of fat required. That is to say, a given viscosity may be obtained, other things being equal, with a substantially smaller proportion of fat ingredient.

A very convenient procedure for incorporating the interface modifiers of my invention is to dissolve them in the fat content of the confection in which they are to be used. The usual fatty materials employed are cocoa butter, so-called pressed butters, coconut oil stearine, palm kernel oil stearine, diary butter, hydrogenated oils and other oils, fats and fatty materials.

The lipophillic groups of the improving agents used may be derived in a mixed form from natural oils and fats such as olive, cotton seed, corn, peanut, sesame, cocoanut stearine, soya bean, sunflower seeds and other vegetable oils, or partially hydrogenated vegetable oils, or oleo and lard, or tallow or other animal fats and oils, or from relatively pure substances such as mixtures of stearic and palmitic acid and/or oleic acid, or from the higher alcohols such as lauryl, cetyl and octo-decyl alcohol and their mixtures.

What I claim as new and desire to protect by Letters Patent of the United states is:

1. A confection composition of the character described comprising a fat, comminuted material dispersed therein, and an ester of sulfuric acid having a terminal lipophile group with at least eight carbon atoms and a hydrophyllic sulphate group.

2. A confection composition of the character described comprising a fat, comminuted material dispersed therein, and a derivative of a polyhydroxy substance having a lipophile group with a definite affinity for oil replacing one hydroxy group and a hydrophyllic sulphate group replacing another hydroxy group.

3. A confection composition of the character described comprising a fat, comminuted material dispersed therein, and a carboxylic acid ester of a polyhydroxy substance wherein the carboxylic acid radical has at least eight carbon atoms and wherein a hydroxy radical of the polyhydroxy substance is replaced by a hydrophyllic sulphate group.

4. A confection composition of the character described comprising a fat, comminuted material dispersed therein, and a di-fatty acid ester of a polyhydroxy substance having at least three hydroxy groups wherein a remaining hydroxy group is replaced by a hydrophyllic sulphate group the fatty acid radical being of relatively high molecular weight.

5. A confection composition of the character described comprising a fat, comminuted material dispersed therein, and a higher fatty acid ester of polyglycerol wherein a hydrophyllic sulphate group is attached to the polyglycerol portion of the molecule.

6. A confection composition comprising fat, sugar, and an ester of sulphuric acid having a terminal lipophile group with at least eight carbon atoms and a hydrophyllic sulphate group.

7. A confection composition including fat and a comminuted material of a class consisting of sugar, cocoa powder, and powdered milk material, having included therein an ester of sulphuric acid having a terminal lipophile group with at least eight carbon atoms and a hydrophyllic sulphate group.

8. A confection composition including fat, having dispersed therein a comminuted material of a class consisting of sugar, cocoa powder, and powdered milk material, and having included therein an interface modifier in the form of a sulphuric acid ester of a polyhydroxy substance wherein a hydrogen of at least one hydroxy group is replaced by a lipophile group with at least eight carbon atoms the sulphate acid radical being hydrophyllic in character.

9. The method of improving compositions of a class consisting of chocolate-like coatings for confections, including candy creams, cookies and ice cream, chocolate confections, icings, fillings, butter creams, fudges, caramels and toffees, which comprises dispersing in such materials a proportion of a sulphuric acid ester having a terminal lipophile group with at least eight carbon atoms and a hydrophyllic sulphate group.

10. The method of producing a confection of a class wherein comminuted sugar material is dispersed in the fat, which comprises dispersing in said fat a proportion of a sulphuric acid ester having a terminal lipophile group with at least eight carbon atoms and a hydrophyllic sulphate group, and combining together other materials of the confection including the sugar and fat to produce the final product.

11. The method of producing a confection of a class wherein comminuted sugar material is dispersed in the fat, which comprises dispersing in said fat a proportion of an interface modifier in the form of a sulphuric acid ester of a polyhydroxy substance wherein a hydrogen of at least one hydroxy group is replaced by a lipophile group having at least eight carbon atoms the sulphate acid radical being hydrophyllic in character.

12. A confection composition comprising a fat, comminuted material dispersed therein, and a hydrophyllic lipin in the form of an ester of sulphuric acid with a lipophile group having at least eight carbon atoms and a hydrophyllic sulphate group, said composition having a viscosity substantially equal to that of an identical composition without the sulphuric acid ester but with a greater fat content.

13. A confection composition including cocoa powder, fat and a relatively small amount of an ester of sulphuric acid having a lipophile group with at least eight carbon atoms and a hydrophyllic sulphate group, said confection composition having a viscosity less than the viscosity of the same composition without said ester of sulphuric acid.

14. A confection composition including cocoa powder, fat and a derivative of a polyhydroxy substance having a lipophile group with a definite affinity for oil replacing one hydroxy group and a hydrophyllic sulphate group replacing the hydrogen of another hydroxy group, said composition having a viscosity less than the viscosity of the same composition without said ester of sulphuric acid.

15. A confection composition of the character described comprising a fat, comminuted material dispersed therein, and a carboxylic ester of a polyhydroxy substance wherein the carboxylic acid radical has at least eight carbon atoms and wherein the hydrogen of a hydroxy radical of the polyhydroxy substance is replaced by a hydrophyllic sulphate group, said confection composition having a viscosity less than the viscosity of the same composition without said ester of sulphuric acid.

16. A confection composition of the character described, comprising an oleaginous material, comminuted material dispersed therein, and a salt of a sulphuric acid ester of a higher molecular weight diglyceride.

17. A confection composition of the character described, comprising an oleaginous material, comminuted material dispersed therein, and a salt of a sulphuric acid ester of a diglyceride derived from a triglyceride of a class consisting of corn oil, peanut oil, cottonseed oil, olive oil, sunflower oil, sesame oil, soybean oil, lard, oleo oil, tallow and hydrogenation products of this class.

18. A confection composition of the character described, comprising an oleaginous material, comminuted material dispersed therein, and a salt of a sulphuric acid ester of a diglyceride derived from the mixed fatty acids of triglycerides of a class consisting of corn oil, peanut oil, cottonseed oil, olive oil, sunflower oil, sesame oil, soybean oil, lard, oleo oil, tallow and hydrogenation products of this class.

19. A confection of the character described, comprising an oleaginous material, comminuted material dispersed therein, and a salt of diolein sulphate.

20. A confection of the character described comprising an oleaginous material, comminuted material dispersed therein, and an ammonium salt of diolein sulphate.

21. A confection comprising a fat, sugar, and an ester of sulphuric acid wherein said ester of sulphuric acid includes a hydrophillic sulphate group and a lipophile group having a definite affinity for oils and fats.

22. A confection comprising fat, sugar, and a derivative of a polyhydroxy substance having a lipophile group, with a definite affinity for oils and fats, replacing one hydroxy group and a hydrophillic sulphate group replacing another hydroxy group.

BENJAMIN R. HARRIS.